US006428902B1

(12) United States Patent
Amundson et al.

(10) Patent No.: US 6,428,902 B1
(45) Date of Patent: Aug. 6, 2002

(54) METHOD OF AND COMPOSITIONS FOR TREATING WOOD

(75) Inventors: Fred J. Amundson, Blaine; Frank S. Tracino, Bellingham, both of WA (US)

(73) Assignee: Chemco Development LLC, Ferndale, WA (US)

( * ) Notice: Subject to any disclaimer, the term of this patent is extended or adjusted under 35 U.S.C. 154(b) by 0 days.

(21) Appl. No.: 08/514,782

(22) Filed: Aug. 14, 1995

(51) Int. Cl.[7] .......................... B32B 23/04; B32B 29/00
(52) U.S. Cl. .................. 428/532; 428/511; 428/528; 428/536; 428/535; 428/537.1; 428/541; 427/393; 427/393.4; 427/397; 427/430.1; 427/440; 427/441
(58) Field of Search .................. 428/511, 528, 428/536, 535, 537.1, 532, 541; 427/393, 393.4, 397, 430.1, 440, 441

(56) References Cited

U.S. PATENT DOCUMENTS

| 2,759,851 A | | 8/1956 | Fluck et al. | 427/394 |
|---|---|---|---|---|
| 3,354,180 A | | 11/1967 | Ekiss et al. | 264/338 |
| 3,660,128 A | | 5/1972 | Sheldahl | 106/271 |
| 3,832,463 A | | 8/1974 | Nicholson | 424/655 |
| 3,865,606 A | | 2/1975 | Neier et al. | 106/271 |
| 4,183,757 A | | 1/1980 | Groszek et al. | 106/14.11 |
| 4,218,249 A | | 8/1980 | Hill | 106/2 |
| 4,612,255 A | | 9/1986 | Hein | 428/541 |
| 4,656,060 A | | 4/1987 | Krzyzewski | 427/397 |
| 4,804,494 A | | 2/1989 | Egerton et al. | 252/397 |
| 4,871,594 A | * | 10/1989 | Bister | 427/430.1 |
| 4,927,672 A | * | 5/1990 | Drinkard | 427/336 |
| 4,950,329 A | | 8/1990 | McIntyre et al. | 106/15.05 |
| 4,988,576 A | * | 1/1991 | Lin | 428/537.1 |
| 5,030,483 A | * | 7/1991 | Drinkard | 427/336 |
| 5,270,083 A | * | 12/1993 | Lotz | 428/22 |
| 5,438,034 A | * | 8/1995 | Walker | 504/158 |
| 5,460,751 A | * | 10/1995 | Ma | 252/400.5 |
| 5,461,108 A | * | 10/1995 | Lewis | 524/596 |

FOREIGN PATENT DOCUMENTS

CA        1334609        3/1995

\* cited by examiner

*Primary Examiner*—Leszek Kiliman
(74) *Attorney, Agent, or Firm*—Miller Nash LLP

(57) ABSTRACT

Pressure impregnation methods for preserving wood. The impregnant combines a wood preservative with a wax-surfactant-water emulsion. A cationic surfactant component made up of two different surfactants is preferred.

13 Claims, No Drawings

METHOD OF AND COMPOSITIONS FOR TREATING WOOD

TECHNICAL FIELD OF THE INVENTION

The present invention relates to novel, improved wood preservative formulations and to methods of employing those formulations.

BACKGROUND OF THE INVENTION

Wood is the building material of choice in a vast variety of applications. This material is subject to relatively rapid deterioration when wet or moist; and wood exposed to the elements is commonly treated to retard deterioration.

The preservation procedures heretofore proposed vary. Typically, a wood preservative such as a chromated copper arsenate (CCA) is mixed with a liquid carrier such as water, and the mixture is introduced under pressure into the wood. In some cases, this is followed by pressure impregnation of the wood with a wax-surfactant-water emulsion. This is commonly known in the industry as a "two-step procedure".

These prior art, techniques proved to be ineffective in preserving western wood species such as hemlock against deterioration; and two-step processes are time consuming, require a capital expenditure for additional equipment, have increased operating costs, and are correspondingly expensive. Also, surfactants commonly employed in heretofore proposed wood preservative formulations cause pump and valve seals to rapidly deteriorate.

Another disadvantage common to heretofore proposed wood preservative formulations is that wax-surfactant particles and preservative particles in those formulations are oppositely charged and tend to be attracted to each other. This results in the formation of surfactant-wax-preservative agglomerates which fall out of suspension and form a sludge on the bottom of the treatment tank. This removal of preservative and wax from the preservative formulation makes it ineffective.

SUMMARY OF THE INVENTION

There have now been invented, and disclosed herein, certain methods for preserving wood which do not have the drawbacks of those heretofore proposed.

The wood preservative techniques of the present invention involve the pressure impregnation of wood with a single formulation which combines a wood preservative with a wax-surfactant-water emulsion. The wax is employed to control the rate at which the treated wood dries and for water repellency. The surfactant component of the emulsion: (1) makes the preservative-emulsion formulation stable, and (2) promotes penetration of the preservative and wax into the wood being treated.

Treatment of wood in accord with the principles of the present invention is effective in the case of both eastern and western species. The treatment process is both cost and time effective because only a single step and the equipment needed for one step is required and because the ingredients of the preservative formulation do not degrade pump and valve seal materials. The formulation is stable over extended periods of time, is capable of effectively penetrating the wood being treated, and does not foam to an excessive extent when applied under pressure to the wood being treated (a common disadvantage of heretofore proposed wood preservative formulations). Both the wood preservative and the water repellant wax are efficiently introduced into the wood being treated; and the treated wood is not slippery, an important safety feature for decking and other wood that is walked on.

Another important advantage of the present invention mentioned briefly above, is that the wax in the wood preservative formulation acts as a water evaporation retardant. The treated wood therefore dries more slowly than it would if otherwise treated and is less likely to warp, crack, or check. This results in a superior treated product.

The important features, advantages, and objects of the present invention will be apparent to the reader from the foregoing and the appended claims taken in conjunction with the accompanying detailed description and discussion of the invention.

DETAILED DESCRIPTION OF THE INVENTION

The novel wood preservative formulations of the present invention are combinations of a wax-surfactant-water emulsion and a wood preservative. The emulsion and preservative are typically, though not necessarily, mixed together at the time- and point-of-use.

The emulsion is formulated as follows:

| Constituent | Concentration (Weight Percent) |
| --- | --- |
| Wax | 1 to 45 |
| Cationic Surfactant Component | 0.03 to 7 |
| Aqueous Carrier | Balance |

The wax functions as a drying retardant and also as a water repellant. Drying retardation is important because this keeps wood treated in accord with the principles of the present invention by pressure impregnation from warping, splitting, or checking as the aqueous carrier evaporates from the treated wood after the impregnation step. Water repellency is also important. After impregnation, the wax causes water reaching the treated wood to bead and run off rather than soaking in and increasing the susceptibility of the wood to deterioration.

A slack wax is representative of those waxes which may be employed in the emulsion. Slack waxes are soft, paraffinic waxes with low melting points produced by the incomplete pressing of the settlings of petroleum distillates. These products are intermediates between distillates and scale waxes, which are made by expressing yet more oil from the distillate. Alternatively, other soft, water repelling waxes with a low melting point and a low oil content or no oil at all can be employed. Higher melting point waxes can also be substituted for or blended with slack wax. Examples of these waxes are: Montan, Beeswax, and Carnauba.

The preferred, if not essential, surfactants are cationic; and a mixture of two surfactants of this character is preferred. It is further required that the surfactant(s) be at least partially soluble in water, be capable of at least partially dissolving the wax component of the formulation, and be possessed of both hydrophobic and hydrophilic properties.

The hydrophobic/hydrophilic and solubility properties are required to ensure a uniform dispersion of the wax component in the aqueous carrier. The novel use of a cationic surfactant component is also of importance. The wood preservatives useful for applicants' purposes are, in general, inorganic compounds, complexes, or mixtures which are also positively charged. Consequently, when the preservative is added to the emulsion, there are like, repelling forces which ensure that the wax and preservative particles remain uniformly dispersed in the aqueous carrier instead of agglomerating and falling out of suspension. The surfactant component also functions as a penetration aid, advantageously promoting the movement of the wax and the preservative into the wood being treated.

Representative, if not preferred, is a combination of a polyoxyethylated oleic acid surfactant or a glycol ester and a polyoxyethylated fatty amine surfactant. Appropriately modified oleic acids include the lower molecular weight, liquid PEG's available from PPG Industries, Inc. A preferred one of these products is PEG 600. Suitable polyoxyethylated amines are available from the Application Chemicals Division of Exxon Chemical Company, which markets those products under the trade name Tomah. A suitable Tomah product, designated E-S-2, is bis(2-hydroxyethyl) soya amine. Particularly if a combination of above-identified cationic surfactants is selected, the surfactants will be employed in a ratio ranging from 1:1 to 3:1.

Typical emulsifier formulations may also include conventional constituents employed for their customary purposes such as pH adjustors, antifoamers, and preservatives.

One exemplary emulsion is formulated as follows:

| Ingredient Number | Name | Concentration (Weight Percent) |
| --- | --- | --- |
| 1 | Slack Wax | 17.06 |
| 2 | PEG 600 MOT | 1.72 |
| 3 | TOMAH E-S-2 | .83 |
| 4 | Water | 79.83 |
| 5 | Acetic Acid (pH Adjuster) | 0.28 |
| 6 | Antifoamer (Dow Chemical Company 1410, 10%) | 0.11 |
| 7 | Formaldehyde 37/7 | 0.17 |

The emulsion can be prepared in a jacketed mixer, the ingredients being sequentially added to the mixer with continuous agitation as follows: Ingredients one, two, and three are heated to 160° F. in the jacketed mixer. At a temperature of 170° F., ingredient four is added to the mixer. The contents of the mixer are pumped through a homogenizer at a pressure of 2000 to 3000 psig. The emulsion is cooled to 130–140° F.; and ingredients five, six, and seven are added under slow agitation. Primarily, the homogenizer reduces the size of the wax particles, which promotes stability of the emulsion.

The preferred wood preservatives are chromated copper arsenates (CCA's). CCA products which meet the standards promulgated by the American Wood Preservers Association in Standard No. P5-77 are widely available. Essentially any of these commercially available CCA's can be employed as can other products with comparable activity. One specific, suitable CCA is CCA OXIDE marketed by OSMOSE under the designation K-33.

As discussed briefly above, the wood to be treated is impregnated under pressure with the emulsion-preservative formulation. Any suitable pressure vessel may be employed.

Process conditions depend upon the specie of wood being treated, its length and width, and other factors such as whether the wood has been air dried, kiln dried, etc. However, the process parameters will invariably fall within the following ranges:

| | |
| --- | --- |
| Pressure (psig) | 130 to 150 |
| Time | 20 minutes to 4 hours |
| Temperature | Ambient |

In one representative application of the invention, 2"×4" Hemlock decking lumber was impregnated with a formulation composed of the exemplary emulsion described above and a 1.3% CCA solution in an autoclave under a pressure of 130 to 150 psig. The decking was then removed from the autoclave, drained, and air dried at ambient temperature. A sample was removed from one of the treated pieces of decking and visually inspected. This showed that the CCA and wax emulsion solution had penetrated inwardly approximately 0.6 in. from each exposed surface of the decking. This penetration is more than adequate. The same procedure was used to treat similar Southern Yellow Pine decking with the inspection showing that the CCA and wax emulsion solution had penetrated the decking completely.

The invention may be embodied in many forms without departing from the spirit or essential characteristics of the invention. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. A wood preservative formulation which consists essentially of:
   a wood preservative component; and
   an emulsion component which is formulated from: a wax constituent in a concentration of 1 to 45 weight percent; a cationic surfactant constituent in a concentration of 0.03 to 7 weight percent; and an aqueous carrier making up the remaining balance, and wherein the cationic surfactant constituent comprises a polyoxyethylated oleic acid composition and a polyoxyethylated fatty amine composition.

2. A wood preservative formulation as defined in claim 1 in which the cationic surfactant constituent comprises a polyoxyethylated oleic acid composition and a polyoxyethylated fatty amine composition in a ratio ranging from 1:1 to 3:1.

3. A wood preservative formulation as described in claim 1 in which the wood preservative is a chromated copper arsenate.

4. A wood preservative formulation as described in claim 1 in which the wax is a slack wax.

5. A wood preservative formulation as defined in claim 1 which comprises a dispersion of the wood preservative component in the emulsion of the wax constituent, the cationic surfactant constituent, and the aqueous carrier.

6. A wood preservative formulation as defined in claim 5 in which the wood preservative is a chromated copper arsenate.

7. A wood preservative formulation as described in claim 5 in which the wax is a slack wax.

8. A method of preserving wood in which:
   the wood is immersed in a body of a wood preservative formulation as defined in claim 2 under a pressure and for a time effective to impregnate the wood with the formulation.

9. A method as defined in claim 8 in which the impregnation of the wood with the wood preservative formulation is carried out at ambient temperature.

10. A method as defined in claim 8 in which the impregnation of the wood is carried out under a pressure of 130 to 150 psig.

11. A method as defined in claim 8 in which the wood is immersed in the preservative formulation under pressure for a time ranging from 20 minutes to 4 hours.

12. Wood impregnated with a preservative formulation as defined in claim 1.

13. Wood as defined in claim 12 which has been impregnated under the following conditions:

| | |
|---|---|
| Pressure (psig) | 130 to 150 |
| Temperature | Ambient |
| Time | 20 minutes to 4 hours. |

* * * * *